Aug. 21, 1923.
H. A. CORRINGTON
CONNECTING LINK FOR TIRE CHAINS
Filed Dec. 22, 1920
1,465,710
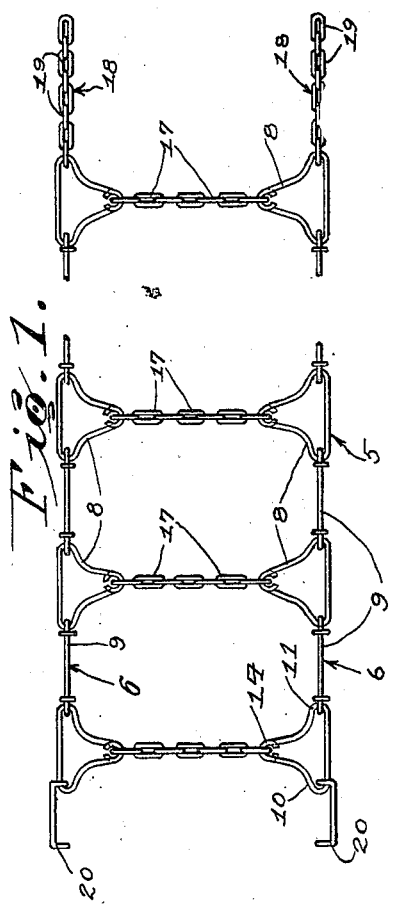
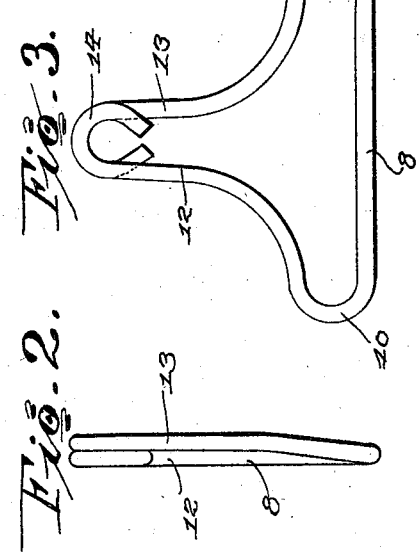
H.A.CORRINGTON.
INVENTOR.
BY
Watson E. Coleman
ATTORNEY.

Patented Aug. 21, 1923.

1,465,710

UNITED STATES PATENT OFFICE.

HOWARD A. CORRINGTON, OF BRANDT, SOUTH DAKOTA, ASSIGNOR OF ONE-HALF TO ALDON R. CORRINGTON, OF BRANDT, SOUTH DAKOTA.

CONNECTING LINK FOR TIRE CHAINS.

Application filed December 22, 1920. Serial No. 432,559.

*To all whom it may concern:*

Be it known that HOWARD A. CORRINGTON, a citizen of the United States, residing at Brandt, in the county of Deuel and State of South Dakota, has invented certain new and useful Improvements in Connecting Links for Tire Chains, of which the following is a specification, reference being had to the accompanying drawings.

This invention relates to automobile tire chains and has for its object to provide a device of this character capable of being readily applied and properly fitted to an automobile wheel.

Another object of the invention is to provide a chain of this character wherein a portion of the side chains also form a portion of the tread chain.

Another object is to provide a chain of this character including a novel junction link substantially triangular in form, the opposed loops or corners of the junction loop forming a portion of the side chains while the remaining loops or corners of the link forms a portion of the tread chain.

Another object of the invention is to provide a junction loop of this character which permits all parts of the chain to be readily assembled or disassembled without the use of special tools should repairs be necessary.

A still further object of the invention is to provide a chain of this character wherein the tension of the tread chain is released after the chain leaves the ground so as to prevent injury to the tire.

With the above and other objects in view, the invention consists in the improved construction and arrangement of parts to be hereinafter more particularly described, fully claimed and illustrated in the accompanying drawings, in which:—

Figure 1 is a plan view of a tire chain constructed in accordance with an embodiment of the invention, Figure 2 is a side elevation of the junction link, Figure 3 is a plan view of the junction link.

Referring to the drawings, 5 designates a chain consisting of side chains 6 and tread chains. Each of the side chains consists of a plurality of junction links 8 and intermediate links 9. Each junction link consists of a length of wire having its end portions extended toward each other substantially in parallel relation to the central portion of the length to provide opposed loops 10 and 11 which form part of the side chains. The end portions 12 and 13 of the junction link are then extended outwardly in spaced relation to each other and substantially at right angles to the central portion of the length, and have their extremities coiled inwardly of the link and toward each other, said coils or extremities being cold shut into frictional engagement with each other to substantially close the entrance to said loops 10 and 11, the extremities of said coils being disposed closely adjacent each other to provide a ring 14, said extremities partially closing the entrance to the ring so as to prevent accidental disengagement of any member disposed within the ring. It will be noted that the coils of the end portions 12 and 13 are disposed in planes parallel to the plane of the link proper so that an endless link is formed.

It will be noted that the loop portion 14 is disposed substantially at right angles to the intermediate portion of the length and in spaced relation to the loops 10 and 11. In this way the ring 14 does not interfere with the portion of the loop 8 forming the side chain. At the same time, the end portions 12 and 13 are extended towards the tread of the tire and form a portion of the tread chain.

The link 9 of the side chain, consists of a single length of material having its end portions 15 coiled upon the main portion of the link to provide a loop 16, the extremity of said loop portion being clenched to the main portion of the link. In this way, a double eyed link is formed from a single length of material. In applying the links 9 to the junction links 8, one of the eyes 16 is passed over one of the coiled extremities of the ends 12 and 13 in parallel relation to the coils. The loop is then extended laterally of the coil and passed over the extremity of one of the end portions. The loop is then moved to either the loop 10 or 11. Another link 9 is positioned in the same manner and in this way the side chains are formed.

The tread chains, comprise a plurality of links 17, the end links of which are passed over the coils of the junction link similar to the eyes of the intermediate links and are then positioned in the loop 14 formed by the coils. In this way the rings 14 form a portion of the tread chain. Another important feature, is that the tread chains serve to lock the junction links, as they embrace both of the coils so that it is impossible for the intermediate links to become accidentally disengaged from the chain when the chain is not in use, as the entrance to the junction link is locked by the end link of the tread chain. Connected to the junction link 8 at one end of each of the side chains is a connecting chain 18 comprising a plurality of links 19 while connected to the junction link 8 at the opposite end of the side chain is a fastening link 20, the end portion 21 being provided with an eye 22, while the end portion 23 is provided with a hook 24. It will be noted that the bill of the hook is disposed at right angles to the portion 23 of the length and in spaced relation thereto.

The chain is applied in the well known manner, the chains 18 being positioned adjacent the fastening links 20. After the side chains have been properly positioned on the tire one of the links of the chain 18 is engaged with the fastening link, passed over the bill of the hook into engagement with the right angular portion 23 of the link 20. In view of the fact that there are several links in the chain 18, the side chains may be adjusted and fastened according to the size of the tire, thereby relieving the tread chains of any part of the fastening operation. This also prevents the thread chains from being embedded into and damaging the tire when the tread chains are not engaged with the ground beneath the tire in the traction operation of the device. As the extremities or coils of the junction link are cold shut, the side chains are permitted to adjust themselves on the tire as this feature permits the junction links to serve the purpose of springs in addition to permitting the various parts of the chain to be readily assembled and disassembled.

From the foregoing it will be readily seen that this invention provides a novel form of tire chain which not only prevents damage to the tire but to the chain itself in view of the novel construction of the junction link and wherein the chain may be repaired by an inexperienced person without the use of special tools. In addition to this considerable material is saved in the construction of the chain.

What is claimed is:—

A junction ring for tire chains comprising a length of resilient material having its end portions extended back upon the central portion of the length to provide opposed loops, said loops being adapted to receive tire chain link members, said end portions of the length being extended outwardly in spaced relation to each other, and substantially at right angles to the central portion of the length, the extremity of each of said end portions being extended back upon their respective end portions to substantially provide hooks, said hooks being disposed one upon the other in planes substantially parallel to the plane of the loops, to close the entrance to the loops, the extremities of the hook being disposed closely adjacent each other and coacting to substantially provide a ring, said ring being adapted to receive a portion of the tread member of the tire chain.

In testimony whereof I hereunto affix my signature.

HOWARD A. CORRINGTON.